United States Patent [19]

Smyly, Sr.

[11] Patent Number: 4,995,187

[45] Date of Patent: Feb. 26, 1991

[54] CRAB POT MANAGING DEVICE

[76] Inventor: George M. Smyly, Sr., 1903-B, Carlton St., North Charleston, S.C. 29405

[21] Appl. No.: 440,671

[22] Filed: Dec. 15, 1989

Related U.S. Application Data

[63] Continuation of Ser. No. 313,071, Feb. 21, 1989, abandoned.

[51] Int. Cl.$^5$ ............................................. A01K 73/00
[52] U.S. Cl. ........................................................ 43/8
[58] Field of Search ........................ 43/4, 8, 27.2, 27.4; 254/385, 415, 413, 387

[56] References Cited

U.S. PATENT DOCUMENTS

| | | | |
|---|---|---|---|
| 827,076 | 7/1906 | Bolitho | 43/8 |
| 3,523,614 | 8/1970 | Walker | 254/385 |
| 3,942,655 | 3/1976 | Andersen | 43/8 |
| 4,209,920 | 7/1980 | Hebert | 43/8 |
| 4,285,501 | 8/1981 | Schneider | 254/415 |
| 4,354,667 | 10/1982 | Svendsen | 43/8 |
| 4,491,301 | 1/1985 | Pendola | 254/415 |

FOREIGN PATENT DOCUMENTS 11486 of 1905 United Kingdom ............... 254/415

Primary Examiner—Kurt Rowan

[57] ABSTRACT

A fishing vessel device having open faced pulleys attached to a pivotal plate member of a traveling assembly. The traveling assembly is winched along a slide rail attached perpendicular to a pivotal cross tee support. Another open faced pulley is attached to the cross tee support such that this pulley is in a coplanar relationship with the traveling pulleys. The cross tee support is pivotally attached to a stanchion and the stanchion is mounted adjacent to the vessel gunnel. The buoy attached end of a crab pot hauling line is retained in a fork shaped device such that when the line is also trained about the open faced pulleys a crab pot can be recovered from the water and suspended within the work area of the vessel. Rotation of the pivotal plate member will result in dumping the hauling line from the traveling pulleys. Rotation of the cross tee support will result in the lowering of the overall height of the fishing vessel.

4 Claims, 4 Drawing Sheets

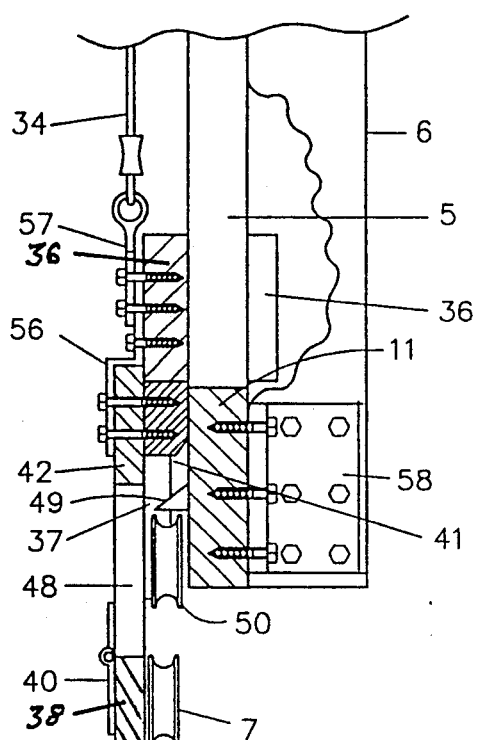
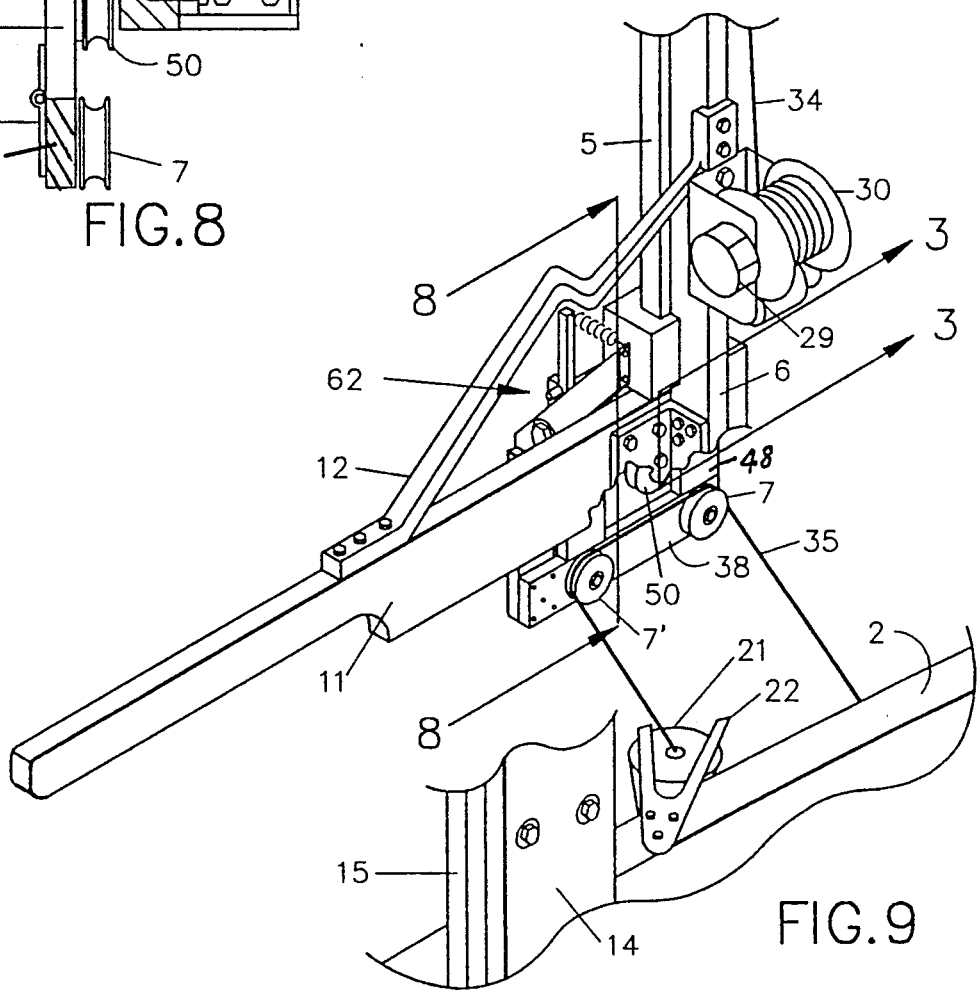

CRAB POT MANAGING DEVICE

REFERENCES TO RELATED APPLICATIONS

This application is a continuation of the application with Ser. No. 313,071 which was filed on Feb. 21, 1989, now abandoned. The earlier filing date of this application is hereby claimed.

BACKGROUND OF THE INVENTION

1. Field of the Invention

The present invention relates to a fishing vessel device for managing a crab pot and the like. More specifically, the present invention relates to a fishing vessel device such that a portion of the device can be rotated about a pivot point thus lowering the overall height of the fishing vessel, and such that the device will recover from and then return to the water a crab pot, to include the associated pot rope and pot buoy.

2. Description of the Prior Art

Many fishermen in the crabbing profession do not use any known mechanical line hauling devices aboard their fishing vessels. Line hauling devices that are used consist of gunnel mounted electrical, or hydraulic, friction reels.

For other line hauling devices there is the "Crab Pot Line Hauler" of Svendsen U.S. Pat. No. 4,354,667, the "Oyster Dredging Apparatus" of Hebert U.S. Pat. No. 4,209,920, the "Lobster Trap Davit" of Anderson U.S. Pat. No. 3,942,655, the "Apparatus For Catching Fish" of Bolitho U.S. Pat. No. 827,076, the "Tackles" of Pendola U.S. Pat. No. 4,491,301, and the "Hydraulic Crane and Bucket Control" of Walker U.S. Pat. No. 3,523,614.

The device of Walker U.S. Pat. No. 3,523,614, shows three conventional pulleys in a coplanar relationship such that hydraulically displacing the central pulley will open and close a crane bucket.

No device is known, however, that can be rotated to lower the overall height of a fishing vessel and that will recover a crab pot from the water, suspend the crab pot from an overhead traveling open faced pulley assembly such that the crab pot can be conveniently serviced, prevent entanglement of the hauling line, and simultaneously drop the crab pot, pot hauling line, and buoy into the water.

SUMMARY OF THE INVENTION

An object of the present invention is to provide a device that will recover a crab pot from the depths.

Another object of the present invention is to provide a device that will suspend the recovered crab pot such that the crab pot can be conveniently serviced.

A further object of the present invention is to provide a device that maintains the hauling line and crab pot buoy outboard of the fishing vessel work area.

Yet another object of the present invention is to provide a device that will drop all components of a rigged crab pot into the water.

Yet a further object of the present invention is to provide a device having pivotal components such that rotating these components will result in lowering the overall height of the fishing vessel.

The foregoing objects can be accomplished by providing a fishing vessel device having an elongated slide rail attached perpendicular to the upper surface of an aft, vessel stern directed arm of a cross tee support, and having an open faced pulley attached to the outboard surface of the cross tee support such that this pulley is in a coplanar relationship with two hereinafter mentioned traveling pulleys. A traveling assembly is associated with the slide rail such that winching means will move the assembly along the slide rail. Longitudinally spaced apart open faced pulleys are attached to a pivotal plate member of the traveling assembly, the rotation of the plate determined by interlocking, pull cord unlocking, pivotal layers. A crab pot hauling line having an end attached buoy retained by a fishing vessel mounted fork retainer and trained about the upper peripheries of the traveling pulleys and the lower periphery of the cross tee pulley will provide means for recovering a crab pot from the water, suspending the crab pot for convenient servicing, and then dropping all components of the rigged crab pot into the water upon pulling the pull cord. The cross tee supporting the combined slide rail and traveling assembly is pivotally attached to a stanchion adjacent to the vessel gunnel. Rotating the cross tee support will provide means for lowering the overall height of the fishing vessel.

BRIEF DESCRIPTION OF THE DRAWINGS

FIG. 8 is an enlarged, fragmentary, partially cutaway, partial sectional view, taken along the line 8—8 of FIG. 9, showing fastening means for the winch cable eye bracket and the component combining brackets, and also shown is the coplanar relationship of two of the open faced pulleys of the crab pot managing device.

FIG. 9 is an enlarged, partially cut-away, perspective view of the traveling open faced pulley assembly in the lower most position upon the cross tee member, and also shown is the buoy retaining fork retainer mounted on the vessel gunnel adjacent to the partial perspective view of the first stanchion.

DETAILED DESCRIPTION OF THE PREFERRED EMBODIMENTS

Figure 1:
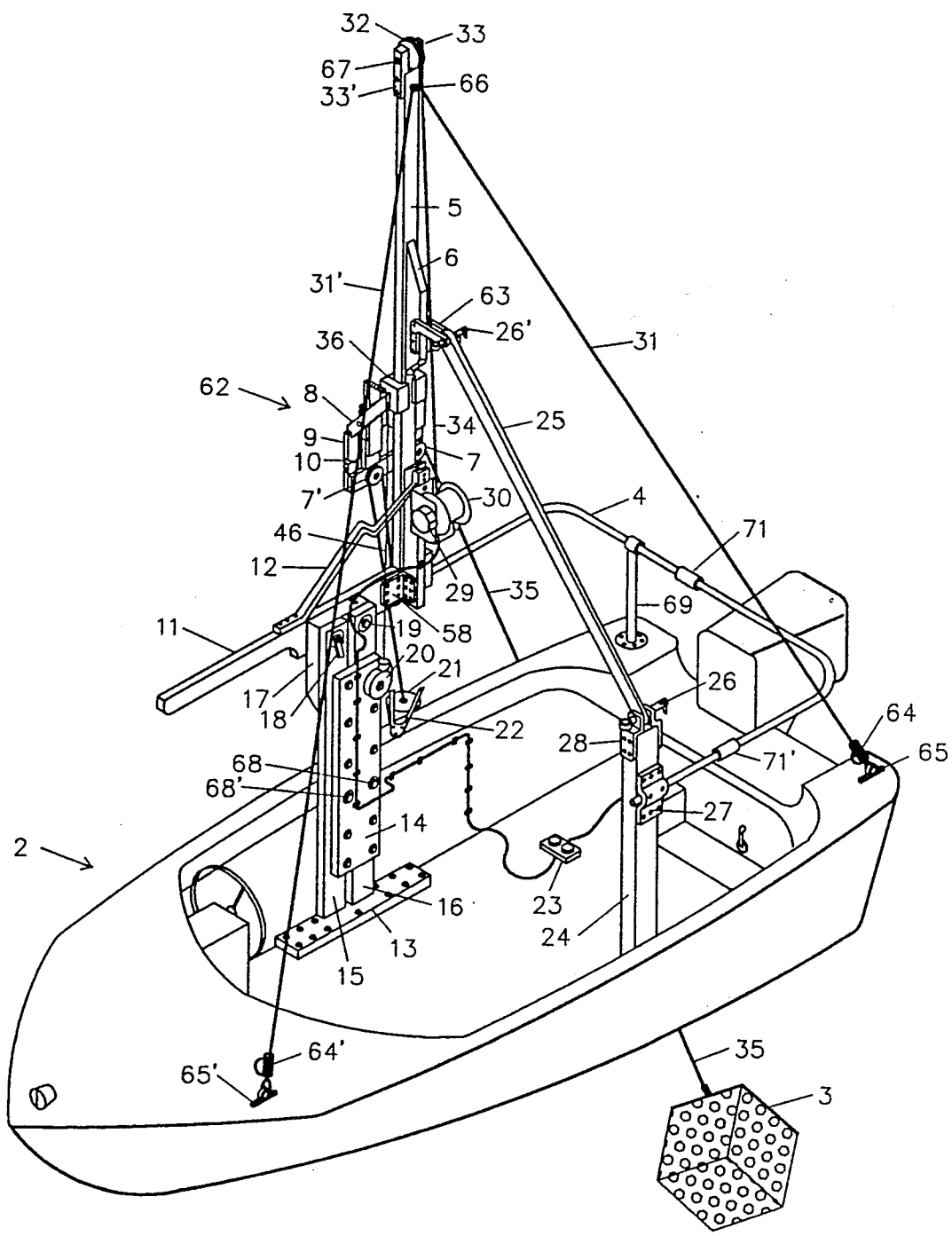
FIG. 1 is a perspective view of the invention, starboard installed aboard a boat, as a crab pot is shown partially lifted.

Referring to the drawings, wherein like parts are designated by like reference characters, this invention is directed to a crab pot and the like managing device which will assist crabbers as they recover from, and then return to, the water, a crab pot, to include the associated pot buoy and rope.

Viewing FIG. 1, a first stanchion, comprising the support member 15, 16, the reinforcing member 14, and the spacer 17, is shown fixedly attached to the vessel 2 deck via means of the deck secured member 13 and also fixedly attached 68, 68' adjacent to the vessel gunnel such that the stanchion extends above the gunnel level. Also shown is a cross tee member 11 comprising a fore, vessel bow directed lever arm and an aft, vessel stern directed support arm, and shown having means for pivotally securing 19 the cross tee member 11 to the upper outboard surface of the stanchion such that removably attached fastening means 18 adjacent to the pivot point will provide means for locking and unlocking the pivot point. The combination of the pivotable cross tee member 11 with the stanchion forming a "T" when the cross tee member 11 is pivotally locked in place. Also shown is an elongated slide rail 5, the slide rail 5 having a slide rail stiffener 6 fixedly attached thereto and also having a top mounted pulley 32 rotatingly secured thereto via means of the axle bolt 67 and the fixedly attached support members 33, 33', the slide rail 5 being fixedly attached perpendicular to the upper surface of the cross tee member 11 support arm via the corner bracket 58. The slide rail 5 is secured upon the cross tee member 11 support arm at the aft, vessel stern directed end of the support arm, such that the slide rail 5 is extending upward from the cross tee 11 support arm when the pivotable cross tee 11 is locked via means of the removably attached fastener 18. Additional support for the slide rail 5 and slide rail stiffener 6 is provided by the brace 12. A reversible winch 30 is shown fixedly attached to the rail stiffener 6, the winch 30 having a knob 29 which will both secure and release the winch clutch mechanism. A traveling open faced pulley assembly 62 is shown captured upon the said slide rail 5 such that cabling 34 and winching means 30 can move the open faced pulley assembly 62 upwardly along the slide rail 5, and such that the force of gravity provides means for downward movement of the assembly 62 along the slide rail 5 upon releasing the winch clutch at 29, or stepping on the reverse push button at member 23.

Figure 4:
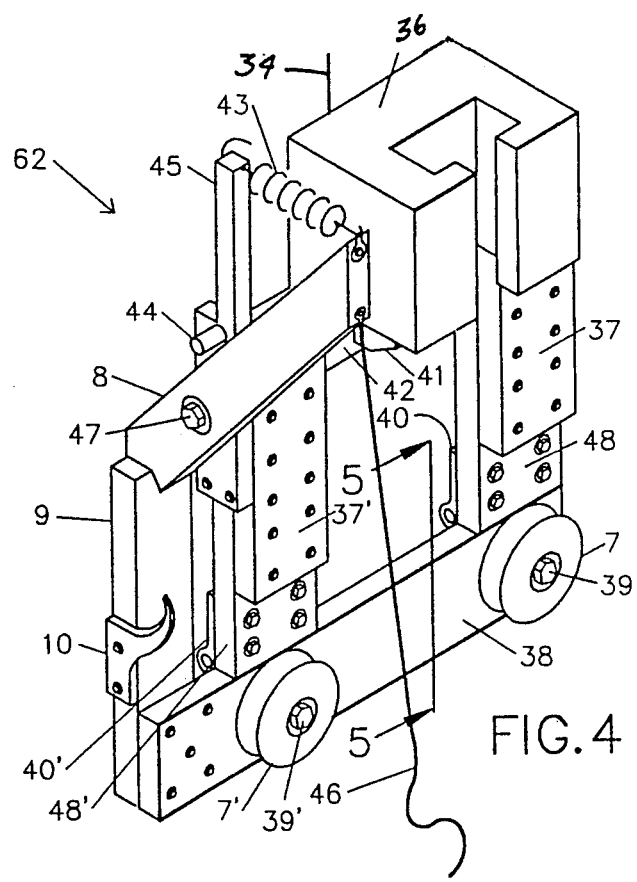
FIG. 4 is an enlarged perspective view of the traveling open faced pulley assembly member of the crab pot managing device to include a section of the lever unlocking pull cord.

Viewing FIG. 4, a pivotally attached plate member 38 of the traveling open faced pulley assembly 62 is shown such that two longitudinally spaced apart open faced pulleys 7, 7' are fixedly attached to the plate member 38 and also shown are means for interlocking pivotal levers 8, 9 to lock and unlock the pivoting, or rotation of the pivotable plate 38. Also shown are block member 37, 37' having a fastening means for securing the hinged 40, 40' plate 38 supporting blocks 48, 48' to the cross member 42. The upwardly protruding spacer and pivotal lever 8 support member 45 is fixedly attached to the block member 37' and the hinged plate support member 48' such as to provide means for having a lever pivot point 47, a lever stop dowel 44, and lever spring 43 attaching means. The arced lever arm reset member 10 shown fixedly attached to the pivotal lever 9 will provide means for the pivotal levers 9, 8 to interlock when the traveling open faced pulley assembly 62 is in a lower most position as shown in FIG. 9.

Viewing FIG. 8, there is shown a beveled backing block 41 serving to reduce griping and friction the solid cut sliding member 36 would experience as the traveling pulley assembly 62 travels along the slide rail 5. Also shown are means for attaching the winch cable 34 eye bracket 57 to the sliding member 36 and means for attaching the combining bracket 56 to the sliding member 36, the cross member 42, and the beveled member 41.

Figure 5:
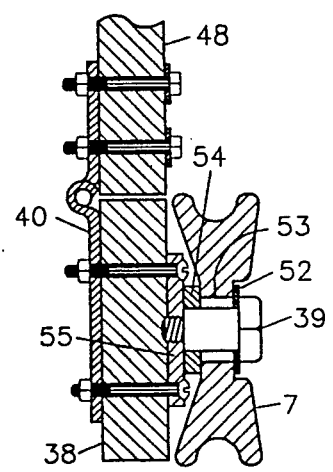
FIG. 5 is an enlarged partial sectional view, taken along the line 5—5 of FIG. 4, showing components of a typical traveling open faced pulley assembly pulley to include fastening means for a hinge and the typical open faced pulley.

Viewing FIG. 5, there is shown a typical pulley assembly. The axle shoulder bolt 39 flush mounts to the pulley backing plate 55, securing the bushinged 53 pulley 7, and having the spacer 54 and washer 52 dimensioned for smooth rotation of the pulley. The plate 38 is sandwiched by the hinge 40 and the pulley backing plate 55.

Viewing a cut-away area of FIG. 9, an open faced pulley 50 is shown having means such that the pulley 50 is fixedly attached to the rearward outboard surface of the cross tee member 11 support arm such that the pulley 50 is in a coplanar relationship with the two pulleys 7', 7 of the traveling open faced pulley assembly 62 when the pivotal plate member 38 is locked via means of the interlocking lever members.

Again viewing FIG. 1, a spring loaded pull cord reel 20 is shown fixedly attached at a convenient location on the crab pot managing device such that the pull cord 46 extends from the cord reel 20 to the end of an unlocking lever arm 8 of the traveling open faced pulley assembly 62.

The fork shaped buoy retainer 22 is shown fixedly attached to the fishing vessel such that the buoy 21 will be retained thereby when tension upon the crab pot hauling line 35 extending from the buoy 21 to the crab pot 3 is trained about the coplanar pulleys.

A second stanchion 24 is shown fixedly attached to the fishing vessel deck and adjacent to the vessel gunnel such that this second stanchion 24 is laterally opposite the slide rail 5 such that a detachably secured diagonally positioned brace member 25 extends downwardly from the bracket attaching means 63 on the slide rail member 6 to bracket attaching means 28 at the top of the second stanchion 24.

Detachably secured guy lines 31, 31' are shown extending from upper attaching means 66 on the slide rail 5 to fore 65' and aft 65 attaching means 64, 64' on the fishing vessel.

Figure 7:
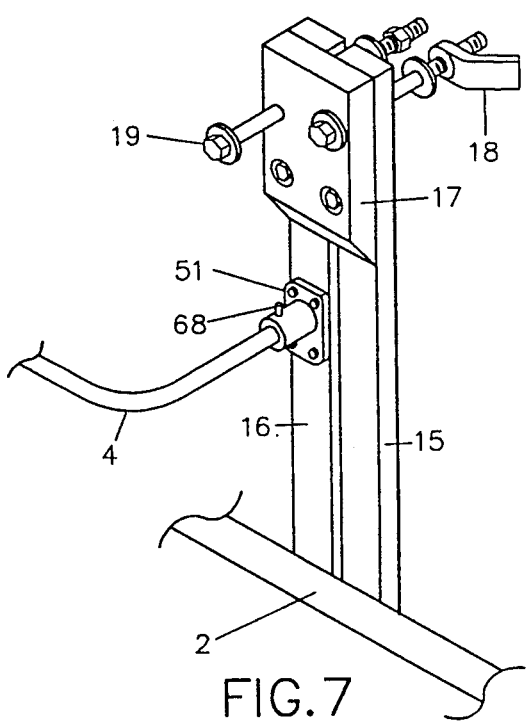
FIG. 7 is an enlarged partial perspective view, taken from the outboard starboard side of the fishing vessel, showing a curved section of the protective rail attached to a member of the first stanchion.

Viewing FIGS. 1 and 7, a protective tubular railing 4 is shown fixedly attached to the stanchions and the fishing vessel such that the railing surroundingly envelopes the work area of the fishing vessel. AT FIG. 1, the rail 4 is shown attached to the port stanchion by means of the bracket 27. Also shown are couplers 71, 71' for the rail and the rail 4 to vessel support member 69. At FIG. 7, the rail 4 is shown fixedly attached to the starboard stanchion member 16 via means of the female bracket 51 and the dowel pin 68.

Figure 2:
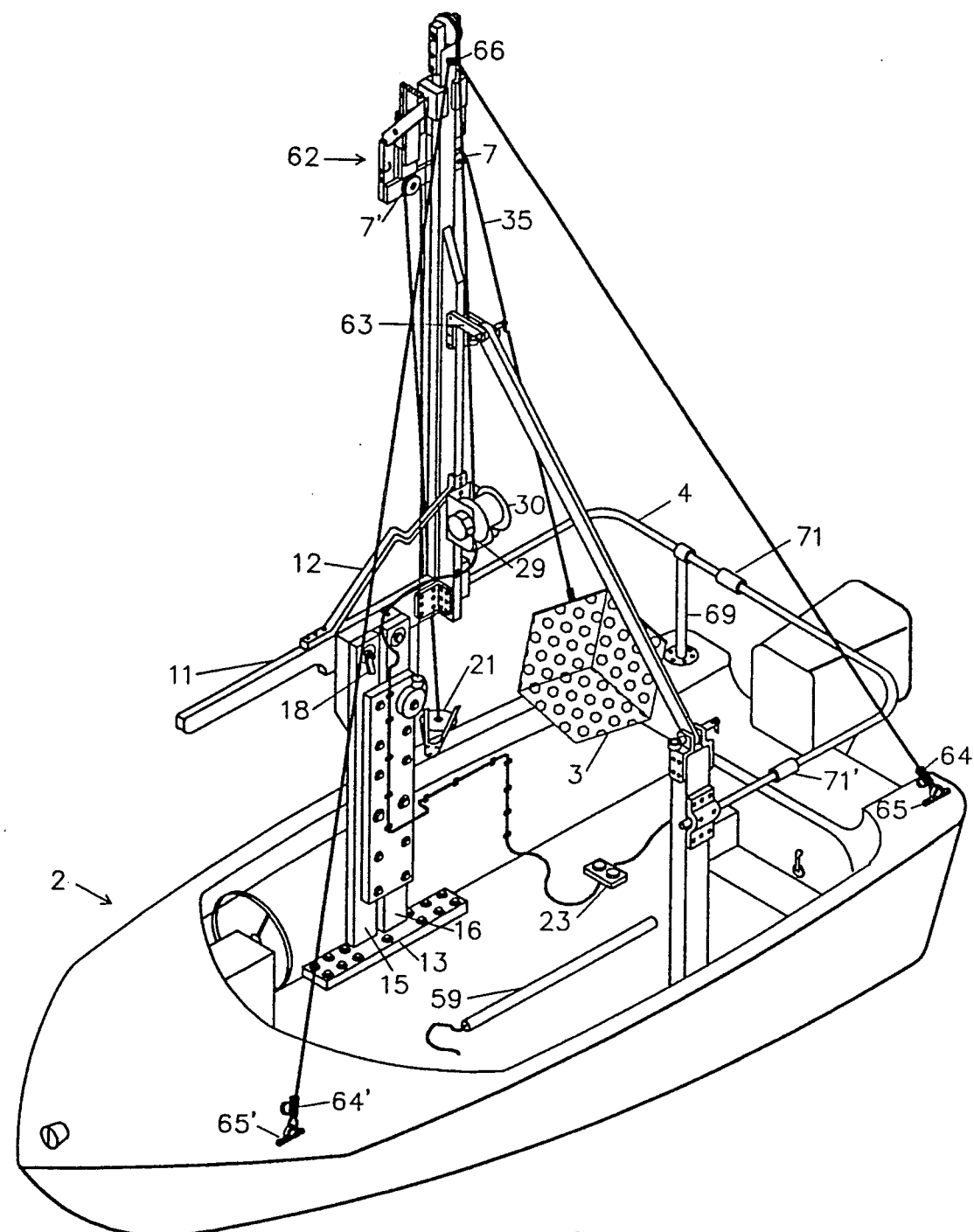
FIG. 2 is a view similar to that of FIG. 1, showing the crab pot in a suspended, ready to be serviced, position.

Viewing FIGS. 1, 2 and 9, a crab pot buoy 21 is shown retained in a fork retainer 22 and the lay of the crab pot hauling line 35 is shown manually trained across the upper peripheries of the two, pivotable plate member 38, longitudinally spaced-apart traveling assembly 62 pulleys 7', 7. Shown in FIGS. 1 and 2, energizing the reversible winch 30 by stepping on the recovery push-button at member 23 moves the traveling open faced pulley assembly 62 along the slide rail 5. Again viewing FIG. 9, when the lower most positioned traveling open faced pulley assembly 62 begins to move upwardly along the slide rail 5, the hauling line 35 will train about the lower periphery of the cross tee member 11 pulley 50, as the cross tee member pulley 50 is in a coplanar relationship with the two traveling pulleys 7', 7. As the traveling open faced pulley assembly 62 continues to travel upwardly along the slide rail 5 as shown in FIG. 1, the crab pot is pulled from the depths until suspended at a desirable working elevation as shown in FIG. 2.

Figure 6:
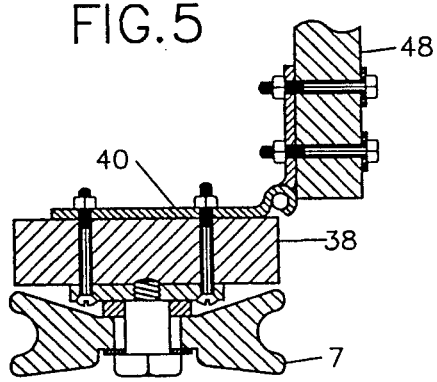
FIG. 6 is a view of FIG. 5 showing a partial section of the pivotal plate pulley support member in a rotated position.

The pull cord 46, unlocking pivotal levers 8, 9, and the pivotal plate member 38 provide means whereby the crab pot 3, to include the associated hauling line 34 and buoy 21 can be dropped from the device into the water. FIG. 6 shows a typical traveling pulley 7 in a rotated position such that a hauling line would be dumped from the upper periphery of the pulley.

Figure 3:
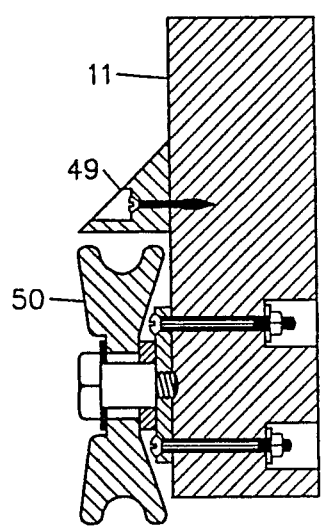
FIG. 3 is an enlarged sectional view, taken along the line 3—3 of FIG. 9, showing the triangular block positioned above the cross tee member pulley such that a dropped hauling line will not snag about the upper periphery of the pulley, and also showing countersunk fasteners securing the pulley assembly to the cross tee member.

Viewing FIG. 3, there is shown a triangular block member 49 fixedly attached above the cross tee member 11 pulley 50 such as to prevent snagging the dropped hauling line about the upper periphery of the pulley 50.

A person skilled in the art would be able to add additional open faced pulleys to the present invention and thus provide more lifting distance.

"The foregoing description of the preferred embodiment of the invention has been presented for the purposes of illustration and description. It is not intended to be exhaustive or to limit the invention to the precise form disclosed. Many modifications and variations are possible in the light of the above teaching. It is intended that the scope of the invention be limited not by this detailed description, but rather by the claims appended hereto."

I claim:

1. A crab pot and the like managing device for a fishing vessel comprising:
   (a) a first stanchion fixedly attached to the vessel deck and adjacent to the vessel gunnel such that said stanchion extends above said gunnel;
   (b) a pivotable cross tee member secured at the upper outboard surface of said first stanchion, the combination of said cross tee member with said first stanchion forming a "T", said cross tee member having a fore, vessel bow directed lever arm and an aft, vessel stern directed support arm, and means for having a removably attached fastener adjacent to said cross tee member pivot point, said fastener providing means for locking and unlocking rotation means of said pivotable cross tee member;
   (c) an elongated slide rail fixedly attached that the upper surface of said cross tee support arm such that said slide rail is perpendicular to said cross tee support arm, said slide rail being positioned near the aft end of said cross tee support arm and extending upward from said cross tee support arm when said pivotable cross tee member is locked, via means of said removably attached fastener, upon said first stanchion;
   (d) a traveling open faced pulley assembly captured upon said slide rail such that cabling and winching means can move said open faced pulley assembly upwardly along said slide rail, the force of gravity providing means for downward movement of said traveling open faced pulley assembly along said slide rail;
   (e) a pivotable plate, being a member of said traveling open faced pulley assembly, having two longitudinally spaced-apart, open faced pulleys fixedly attached thereto, and means for having interlocking pivotal levers for locking and unlocking the rotating of said pivotable plate;
   (f) an open faced pulley fixedly attached to the outboard surface of said cross tee member support arm such that said pulley is in a coplanar relationship with said plate member pulleys when said pivotable plate member is locked via means of said interlocking levers;
   (g) a spring loaded pull cord reel fixedly attached at a convenient location on said crab pot managing device such that a pull cord extends from said cord reel to the end of an unlocking lever arm member of said interlocking pivotal lever means;
   (h) a fork shaped buoy retainer fixedly attached to said fishing vessel such that a buoy will be retained thereby when tension upon a hauling line extending from said buoy to a crab pot is trained about said coplanar pulleys;
   (i) a second stanchion fixedly attached to said fishing vessel deck and adjacent to said vessel gunnel such that said second stanchion also extends above said gunnel, said second stanchion being laterally opposite said slide rail such that a detachably secured, diagonally positioned brace member extends downwardly from bracket attaching means on said slide rail to bracket attaching means at the top of said second stanchion;
   (j) detachably secured guy lines extending from upper attaching means on said slide rail to fore and aft attaching means on said fishing vessel; and
   (k) a protective tubular railing fixedly attached to said stanchions and said fishing vessel such that said railing surroundingly envelopes the work area of said fishing vessel.

2. The crab pot managing device as in claim 1, wherein said interlocking pivotal levers have means for self-locking as said traveling open faced pulley assembly, moving downward along said slide rail, approaches the lower most position upon said slide rail.

3. The crab pot managing device as in claim 1, wherein rotating said pivotable cross tee member results in lowering the overall height of said fishing vessel.

4. A device for a fishing vessel comprising:
   a stanchion fixedly attached to the vessel deck and adjacent to the vessel gunnel; a cross tee having a fore, vessel bow directed lever arm and an aft, vessel stern directed support arm and means for pivotally securing said cross tee to the outboard surface of said stanchion such that removably attached fastening means provide means for locking and unlocking said cross tee pivot point, the combination of said cross tee and said stanchion, said pivot point being locked, forming a "T"; an elongated slide rail fixedly attached perpendicular to the upper surface of said aft support arm; an open faced pulley assembly upon said slide rail, means for winching said assembly upward along said slide rail, the force of gravity moving said assembly downward along said slide rail; a plate member of said assembly, said plate being pivotally attached to said assembly, said plate having longitudinally spaced-apart open faced first pulleys fixedly attached thereto, and means for having interlocking pivotal lever members of said assembly unlocking permitting rotation of said plate, and a second open faced pulley fixedly attached to said cross tee support arm, said second pulley and said plate member first pulleys having a coplanar relationship when said interlocking levers are locked preventing rotation of said plate; a cord reel fixedly attached to said device, means for having a pull-cord extending from said reel to said interlocking levers, said pull-cord providing means for unlocking said interlocking levers permitting rotation of said plate; a fork retainer fixedly attached to said fishing vessel, a buoy being retained by said retainer via tension upon a hauling line, said line extending from said buoy and training about said coplanar pulleys; a second stanchion fixedly attached to said fishing vessel such that a detachably secured, diagonally positioned brace extends from attaching means on said slide rail to attaching means at the top of said second stanchion; detachably secured guy lines extending from upper attaching means on said slide rail to fore and aft attaching means on said fishing vessel; and a protective railing, surrounding said fishing vessel work area, said railing being fixedly attached to said stanchions and said fishing vessel.

* * * * *